(12) United States Patent
Rodon (10) Patent No.: US 7,305,356 B2
(45) Date of Patent: Dec. 4, 2007

(54) TRAVEL VALUE INDEX

(75) Inventor: Lincoln Rodon, Coral Gables, FL (US)

(73) Assignee: Amadeus Americas, Inc., Miami, FL (US)

( * ) Notice: Subject to any disclaimer, the term of this patent is extended or adjusted under 35 U.S.C. 154(b) by 741 days.

(21) Appl. No.: 09/865,799

(22) Filed: May 25, 2001

(65) Prior Publication Data

US 2003/0050846 A1 Mar. 13, 2003

(51) Int. Cl.
*G06Q 30/00* (2006.01)

(52) U.S. Cl. ....................................... 705/27

(58) Field of Classification Search ............ 705/1, 705/5, 6, 26, 27
See application file for complete search history.

(56) References Cited

U.S. PATENT DOCUMENTS

| | | | |
|---|---|---|---|
| 4,862,357 A | 8/1989 | Ahlstrom et al. | |
| 5,021,953 A | 6/1991 | Webber et al. | |
| 5,309,355 A | 5/1994 | Lockwood | |
| 5,331,546 A * | 7/1994 | Webber et al. | 705/6 |
| 5,550,746 A | 8/1996 | Jacobs | |
| 5,644,721 A | 7/1997 | Chung et al. | |
| 5,732,398 A | 3/1998 | Tagawa | |
| 5,832,451 A | 11/1998 | Flake et al. | |
| 5,832,454 A * | 11/1998 | Jafri et al. | 705/6 |
| 5,933,810 A | 8/1999 | Okawa | |
| 6,012,053 A | 1/2000 | Pant et al. | |
| 6,018,715 A | 1/2000 | Lynch et al. | |
| 6,023,679 A | 2/2000 | Acebo et al. | |
| 6,067,552 A | 5/2000 | Yu | |
| 6,073,130 A | 6/2000 | Jacobson et al. | |
| 6,119,094 A * | 9/2000 | Lynch et al. | 705/5 |
| 6,236,990 B1 * | 5/2001 | Geller et al. | 707/5 |
| 6,275,808 B1 | 8/2001 | DeMarcken | |
| 6,295,521 B1 | 9/2001 | DeMarcken | |
| 6,307,572 B1 | 10/2001 | DeMarcken | |
| 6,381,578 B1 * | 4/2002 | DeMarcken | 705/6 |
| 2001/0044748 A1 * | 11/2001 | Maier | 705/26 |

FOREIGN PATENT DOCUMENTS

| | | | | |
|---|---|---|---|---|
| EP | 0644499 A2 | 3/1995 | | |
| GB | 2328530 A | 2/1999 | | |
| GB | 2 353 112 A | 2/2001 | | |
| GB | 1076307 | * 2/2001 | | 705/5 |
| WO | WO 97/32268 | 9/1997 | | |
| WO | WO 00/02153 | 1/2000 | | |
| WO | WO 00/39726 | 7/2000 | | |
| WO | WO 01/33394 | 5/2001 | | |

* cited by examiner

*Primary Examiner*—Gerald J. O'Connor
(74) *Attorney, Agent, or Firm*—Baker & McKenzie LLP (57) ABSTRACT

Method and system are disclosed for assigning a relative value to a search result based on the personal preferences of the consumer. A consumer profile may be created for each consumer. The profile may contain the consumer's personal preferences for each one of the search criteria. A search value index may be derived for the search results based on the preferences in the consumer profile. The search value index may indicate to the consumer the value of a particular search result relative to other search results. Search results satisfying a consumer defined threshold may be retained, while the rest may be discarded.

6 Claims, 8 Drawing Sheets

TRAVEL VALUE INDEX

BACKGROUND OF THE INVENTION

1. Field of the Invention

The present invention is related to the evaluation of information searches and, more particularly, to a method and system for assigning relative value to the results of such information searches.

2. History of the Related Art

A number of search options are available to help consumers find goods and services. For example, in the travel planning industry, a professional travel agent can help the consumer find available flights, hotel rooms, car rentals, and the like. Typically, the travel agent accesses one or more public or private reservation databases available from travel services providers (e.g., airlines, hotels, car rental agencies) to obtain several possible travel solutions that are presented to the consumer for evaluation. The consumer can also directly search for these services via a travel Web site that specializes in finding such services. In the latter case, the consumer simply provides information such as the origination, destination, and dates of his travel. A search engine associated with the Web site thereafter queries the appropriate databases to obtains several possible travel solutions that are presented to the consumer for evaluation.

The success of such consumer targeted Web sites has given rise to the development of specialty search engines that focus on finding certain types of information. For example, in the travel planning industry, Low Fare Search Engines (LFSE) have been developed that specialize in finding inexpensive fares. These LSFE produce multiple fare solutions by performing iterative searches of fare pricing databases and comparing the results with search results from fare availability databases. A number of constraints such as the application of certain fare validity rules and also data processing limitations combine to produce a subset of the total possible fare solutions. The solutions are then presented to the consumer in order of the lowest fares first.

Specialty search engines and search engines in general, however, can sometimes provide too many solutions for the consumer to thoroughly evaluate in a reasonable amount of time. Thus, some of the search results may initially appear unusable to the consumer based on his personal preferences, but may actually turn out to be very acceptable when properly evaluated, and vice versa. Referring to the travel planning industry again as an example, a travel solution requiring several connecting flights may be rejected at first glance by a traveler who prefers a non-stop trip. However, other aspects of the itinerary such as frequent flyer miles, a low fare, meals, movies, seating, and the like, may cause the traveler to reconsider when properly evaluated. On the other hand, some travel solutions may have aspects that are so out of line with the traveler's preferences that, a non-stop trip notwithstanding, they should not be included at all in order to save time. Therefore, it is desirable to be able to present the results of an information search in such a way that the consumer may quickly evaluate the search results in accordance with his preferences. More particularly, it is desirable to be able to assign a relative value to each one of the search results based on the preferences of the consumer in order to facilitate selection therefrom.

One method of listing the results of an information search is by the number of search criteria for which a match was found. Under this approach, search results in which every search criteria were found are listed ahead of search results in which less than all search criteria were found. The number of criteria found in a given search result is usually indicated using a percentage. For example, if a particular search found four out of five specified criteria, the result would be listed as an 80 percent match.

Another method of listing the results of an information search is by the number of "hits" or matches found for a particular criterion. This method is premised on the assumption that results containing a higher number of hits are more likely to be relevant or desirable. Under this approach, search results containing 10 hits of a particular criterion, for example, are listed ahead of search results containing fewer than 10 hits.

None of the aforementioned methods, however, provide a way to assign a relative value to a search result based on the personal preferences of the consumer.

SUMMARY OF THE INVENTION

The present invention is directed to a method and system for assigning a relative value to a search result based on the personal preferences of the consumer. A consumer profile may be created for each consumer. The profile may contain the consumer's personal preferences for each one of the search criteria. A search value index may be derived for the search results based on the preferences in the consumer profile. The search value index may indicate to the consumer the value of a particular search result relative to other search results. Search results satisfying a consumer defined threshold may be retained, while the rest may be discarded.

In one aspect, the invention is directed to a business method for evaluating the results of an information search based on one or more search criteria. The business method comprises the steps of deriving preference factors for the search criteria based on user preferences for the search criteria, and applying a search value algorithm that is based on the preference factors to the results of the information search. A search value index is calculated for each one of the results of the information search using the search value algorithm.

In another aspect, the invention is directed to a method for facilitating the selection of travel itineraries. The method comprises the steps of selecting a travel criteria, defining a traveler profile containing preferences associated with the travel criteria, deriving preference factors based on the traveler preferences, and initiating a query of at least one travel information database for itineraries matching the selected travel criteria. A travel value index is calculated for each itinerary using a travel value algorithm based on the preference factors.

In yet another aspect, the invention is directed to a computer system for evaluating the results of an information search. The computer system comprises a central processing unit, and a storage unit connected to the central processing unit and capable of storing a search value program thereon. The search value program is configured to derive preference factors for the search criteria based on user preferences therefor, and apply a search value algorithm based on the preference factors to the results of the information search. The search value program is further configured to calculate a search value index for each one of the results of the information search using the search value algorithm.

In still another aspect, the invention is directed to a computer system for facilitating the selection of travel itineraries. The computer system comprises a central processing unit, and a storage unit connected to the central processing unit and capable of storing a search value program thereon. The search value program is configured to allow a traveler to select a travel criteria and to set preferences therefor in a traveler profile, to derive preference factors for the travel criteria based on the travel preferences, and to initiate a query of at least one travel information database for itineraries matching the selected travel criteria. The search value program is further configured to calculate a travel value index for each itinerary using a travel value algorithm based on the preference factors.

In still another aspect, the invention is directed to a server for hosting an on-line travel planning application containing a search value program to facilitate selection of travel itineraries. The server comprises a central processing unit, and a storage unit connected to the central processing unit and capable of storing the search value program thereon. The search value program is configured to allow a traveler to select a travel criteria and to set traveler preferences therefor in a traveler profile, derive preference factors including a lowest fare multiplier, an available dates index, a non-stop service index, and an equipment type index for the travel criteria based on the traveler preferences, and initiate a query of at least one travel information database for itineraries matching the selected travel criteria using an on-line search engine. The search value program is further configured to calculate a travel value index for each itinerary using a travel value algorithm that subtracts preference factors from, or adds preference factors to, or both, an optimal value of the travel value index depending on the criteria matching itineraries.

In still another aspect, the invention is directed to a method for facilitating selection of travel itineraries. The method comprises the steps of selecting a travel criteria, defining a traveler profile containing traveler preferences associated with the travel criteria, deriving preference factors including a lowest fare multiplier, an available dates index, a non-stop service index, and an equipment type index for the travel criteria based on the traveler preferences, and initiating a query of at least one travel information database for itineraries matching the selected travel criteria using an on-line search engine. A travel value index is calculated for each itinerary using a travel value algorithm that subtracts preference factors from, or adds preference factors to, or both, an optimal value of the travel value index depending on the criteria matching itineraries.

BRIEF DESCRIPTION OF THE DRAWINGS

A more complete understanding of the method and apparatus of the present invention may be had by reference to the detailed description in conjunction with the following drawings, wherein.

DETAILED DESCRIPTION OF THE PREFERRED EMBODIMENTS

Following is a detailed description of the exemplary preferred embodiments of the present invention with reference to the drawings, wherein like numerals refer to like and corresponding parts.

Embodiments of the invention provide a method and system for evaluating the results of an information search. The consumer may conduct such an information search through a number of public (e.g., the Internet) or private (e.g., Amadeus Global Travel Distribution, L.L.C.) on-line search engines. The search engines query or otherwise access one or more databases containing the desired information and returns a list of possible solutions or search results. In accordance with the present invention, a search value index is assigned to each one of the search results. The search value index is calculated using an algorithm that may be based primarily on the personal preferences of the consumer regarding the criteria that were used to conduct the search. A criterion that may be particularly important to the consumer can be given more weight in the algorithm than a criteria that the consumer considers to be of little or neutral benefit. These personal preferences may be defined and contained in a consumer profile, which may be modified by the consumer from time to time as needed. Secondary considerations such as industry quality measurements and surveys may also be factored into the algorithm. The search value indices allow the consumer to make more meaningful evaluations of the search results based on the consumer preferences. In addition, an otherwise large number of search results may be reduced to only those results satisfying a certain threshold value defined by the consumer.

Figure 1:
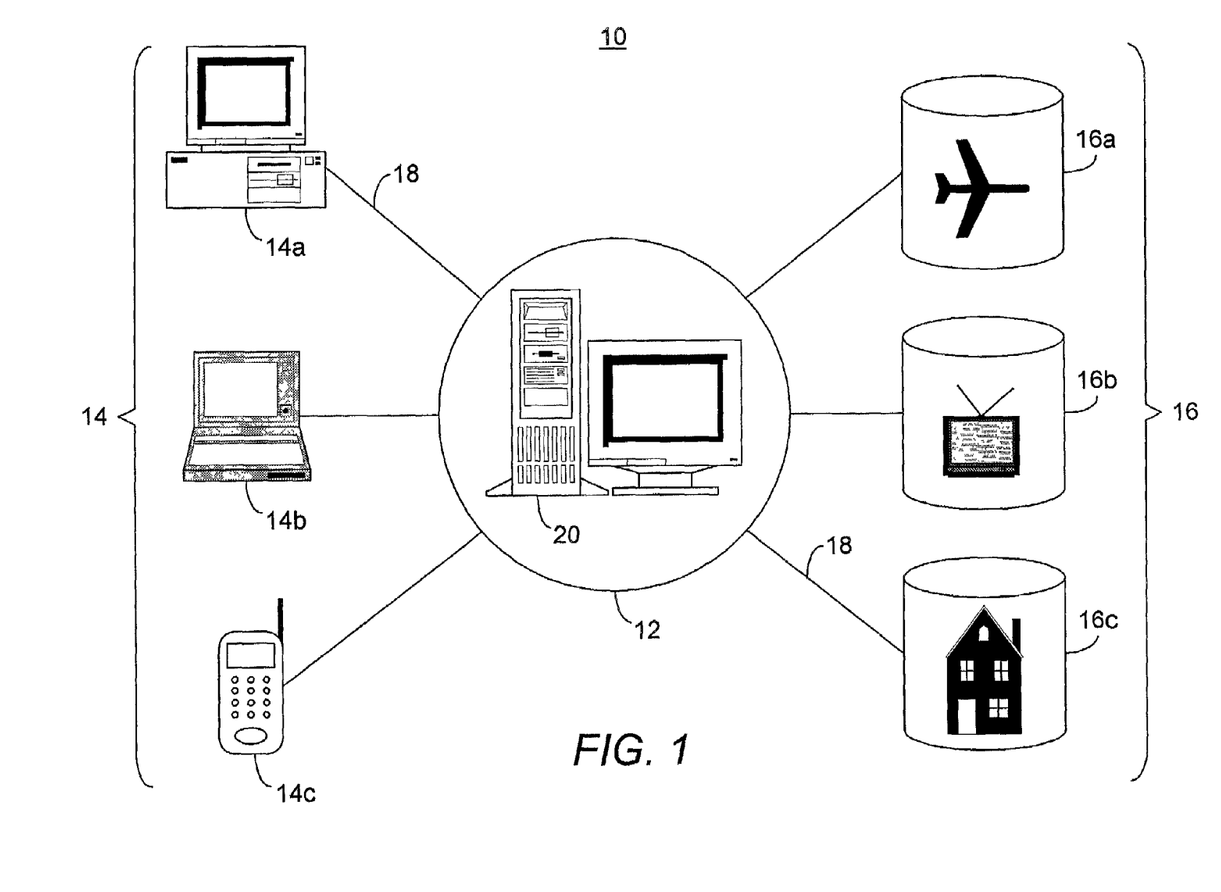
FIG. 1 illustrates a pertinent portion of a network in which the present invention may be used.

FIG. 1 illustrates a pertinent portion of an exemplary network 10 in which the present invention may be used. In some embodiments, the network 10 may be a portion of a public network such as the Internet, or it may be part of a private, subscription based network in other embodiments. The configuration of the network 10 is of a typical client/server configuration in which a centralized server 12 services a plurality of clients or users 14. The server 12 has access to or is otherwise able to query one or more databases 16 containing various types of information. A plurality of network connections 18 connect the server 12 to the users 14, and also to the databases 16. In operation, the server 12 provides a number of paid and/or complimentary services to the users 14 including retrieval of data from the databases 16.

The users 14 may include essentially anyone who is looking for information on a particular product and/or service and who has access to the network 10 and specifically to the server 12. For example, the users 14 may include the average consumer who accesses the server 12 via a desktop computer 14a, a business executive who accesses the server 12 via a laptop computer 14b, or a professional services provider who accesses the server 12 via a cellular telephone 14c.

Likewise, the databases 16 may include databases containing essentially any type of data and/or information that are searchable by the server 12. For example, the databases 16 may include a travel information database 16a, a consumer goods information database 16b, or a real estate information database 16c. Moreover, although the databases 16a-16c are shown here as separate databases, those of ordinary skill in the art will recognize that one or more of the databases 16a-16c may be combined with any other one or more of the databases 16a-16c. Furthermore, although the databases 16 are shown to reside externally to the server 12, those of ordinary skill in the art will understand that the databases 16 may also be an integrated part of the server 12.

At the heart of the server 12 resides at least one high-end computer system 20 with sufficient data processing and storage capacity to handle the demands expected to be placed thereon. In some embodiments, the high-end computer system 20 includes a Web server that is capable of hosting a Web site thereon as well as a number of Web based applications associated with the Web site, such as a search engine. In these embodiments, the users 14 may access the server 12 simply by connecting to the Internet and opening the appropriate URL address of the Web site.

Figure 2:
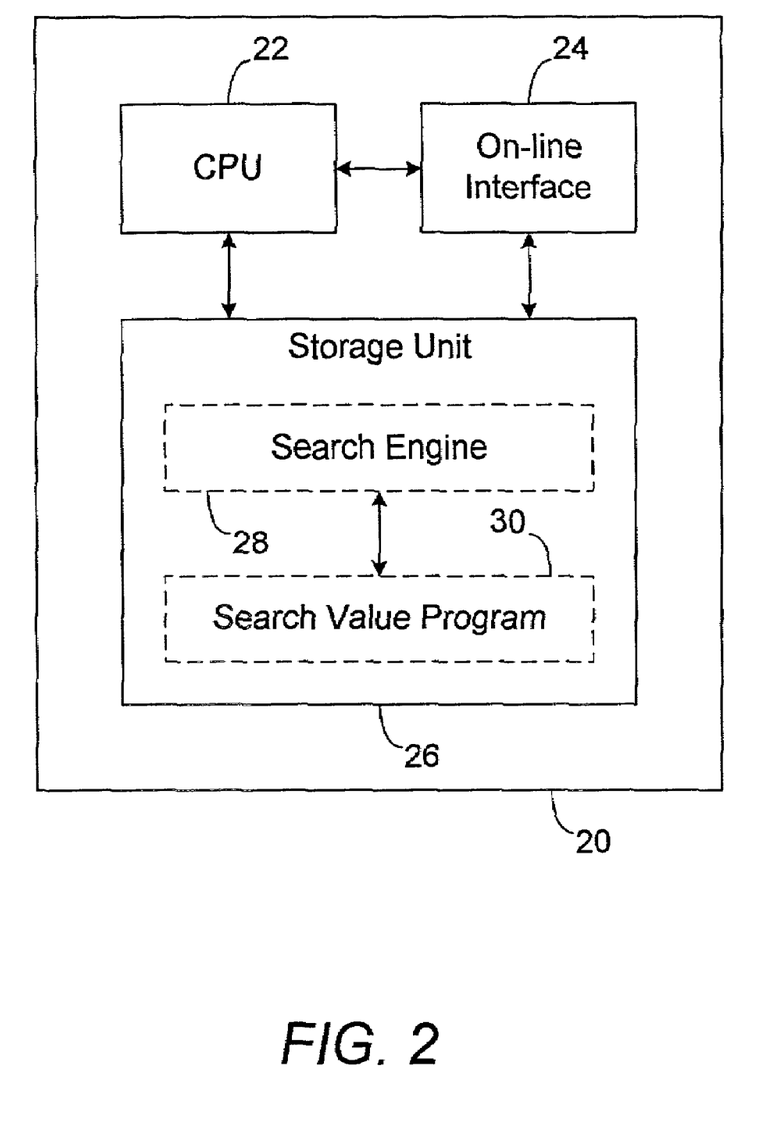
FIG. 2 illustrates an exemplary computer system according to some embodiments of the invention.

The high-end computer system 20 is illustrated in more detail in FIG. 2. As can be seen, a number of functional components make up the high-end computer system 20 including a central processing unit 22, an on-line interface unit 24, and a storage unit 26, all connected together as shown. Basically, the central processing unit 22 has primary responsibility for the overall operation of the high-end computer 20 including execution of the operating system therefor as well as any associated applications thereon. The on-line interface unit 24 is responsible for handling the various procedures and protocols necessary to connect the high-end computer 20 to the users 14 and the databases 16. Finally, the storage unit 26 provides both long-term and temporary storage of the operating system and any data used by the high-end computer 20.

In some embodiments, the storage unit 26 also stores the software applications that are run on the high-end computer 20 including a search engine 28 and a search value program 30 in accordance with the present invention. An advantage of this arrangement is the search engine 28 and the search value program 30 may be executed remotely at the server 12 and no local installation thereof is necessary at the users 14. In practice, however, some supporting software for the search engine 28 and/or the search value program 30 may be required at the users 14. Also, although the search engine 28 and the search value program 30 are shown here as separate applications, in other embodiments, the two applications may be combined into a single application that performs both the search and value assignment functions.

The search engine 28, which may be a standard search engine or a specialty search engine such as an LFSE, operates to query or otherwise retrieve data from the databases 16 based on one or more search criteria defined by the users 14.

To enhance the effectiveness of the search engine 28, the search value program 30 may operate to assign a relative value to each one of the search results. Such a relative value may facilitate evaluation and selection of the search results by the users 14. In some embodiments, the search value program 30 may be a Web based application that is accessible via the Internet, and the high-end computer 20 may be a Web server for hosting the Web based application. The users 14 may remotely execute the search value program 30 simply by clicking on the appropriate link in the Web site using one of many commercially available Web browser applications.

Figure 3:
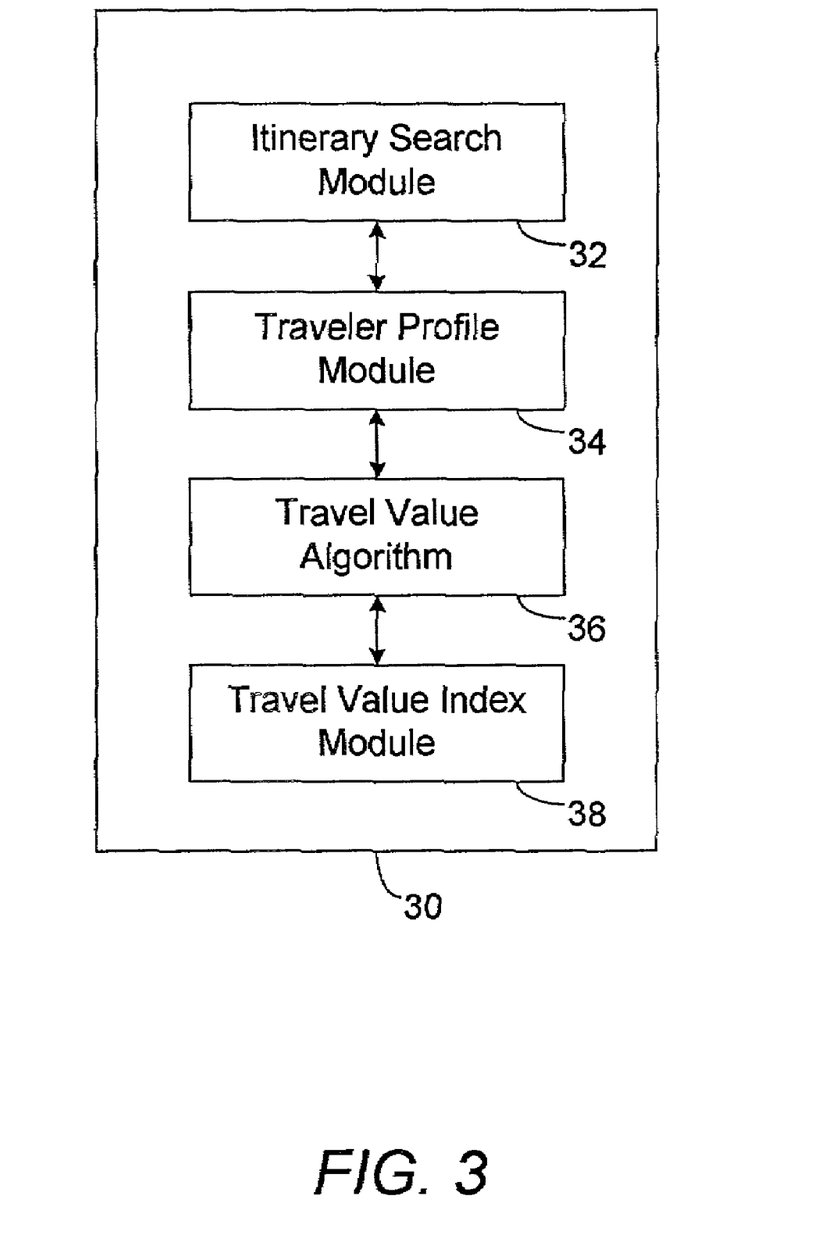
FIG. 3 illustrates an exemplary search value program according to some embodiments of the invention.

FIG. 3 illustrates in more detail the various functional components of the search value program 30 according to some embodiments of the invention. In order to facilitate a better understanding of the search value program 30, the description thereof will be provided in the context of a specific application area, namely, the travel planning industry. The invention is not to be limited only to this industry, however, but may be equally applicable to any industry where information searches are employed.

As can be seen in FIG. 3, the search value program 30 includes at least an itinerary search module 32, a traveler profile module 34, a travel value algorithm module 36, and a travel value index module 38. Each of these modules are described below.

Figure 4:
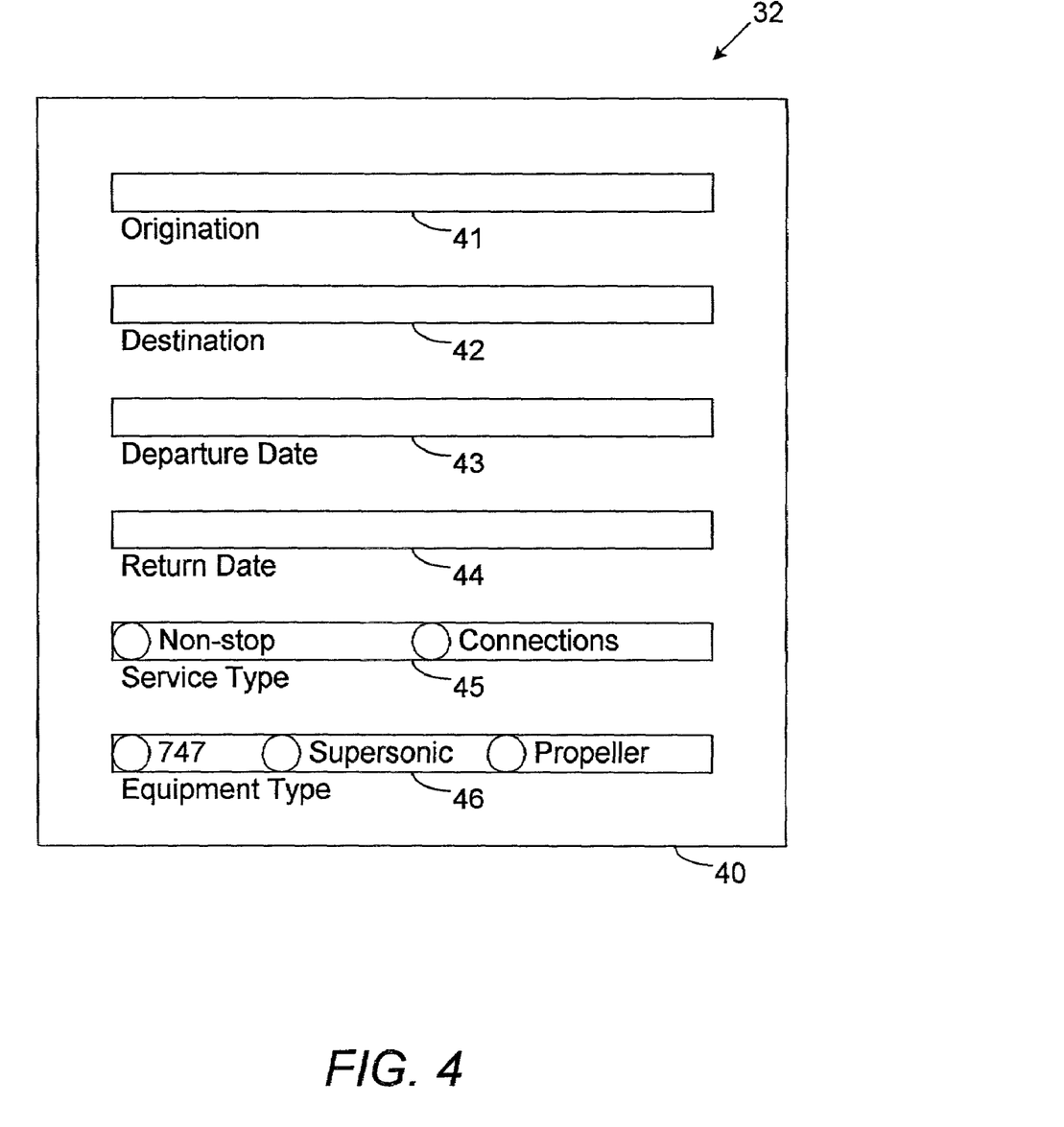
FIG. 4 illustrates an exemplary itineraries search module according to some embodiments of the invention.

The itinerary search module 32 functions to accept one or more basic travel criteria from a traveler and to initiate a search of the databases 16 using these criteria. In some embodiments, the itinerary search module 32 may include a travel criteria user interface, an example of which is shown in FIG. 4 at 40. The exemplary travel criteria user interface 40 accepts six basic travel criteria which may be inputted using the following data entry boxes: an origination box 41 for entering the travel origination, a destination box 42 for entering the travel destination, a departure date box 43 for entering the departure date, a return date box 44 for entering the return date, a service type box 45 for selecting the service type (e.g., non-stop versus connections), and an equipment type box 46 for selecting the equipment type (e.g., 747 jumbo jet versus a supersonic jet versus a propeller-driven airplane). Although only six criteria are used here, those of ordinary skill in the art will understand that any criterion may be added to or removed from the list of travel criteria as needed. For convenience, the service type box 45 and the equipment type box 46 may have small checkboxes that can be double-clicked to enter the travel criteria.

After the traveler has selected and entered the travel criteria via the travel criteria user interface 40, the itinerary search module 32 may pass this information to the search engine 28, and may cause the search engine 28 to initiate a query of the databases 16. The particular database queried in this embodiment may be a travel information database 16a that stores information regarding various travel related services.

The traveler profile module 34 allows the traveler to define and modify as needed a number of personal travel preferences along with the degree to which they may influence the selection of an itinerary. For example, through the operation of the traveler profile module 34, the traveler may specify the degree to which he prefers a nonstop flight over a flight that makes one or more connections, or how flexible he is with regard to the specific dates he plans to travel. An example of a traveler profile according to some embodiments of the invention is illustrated in FIG. 5.

Figure 5:
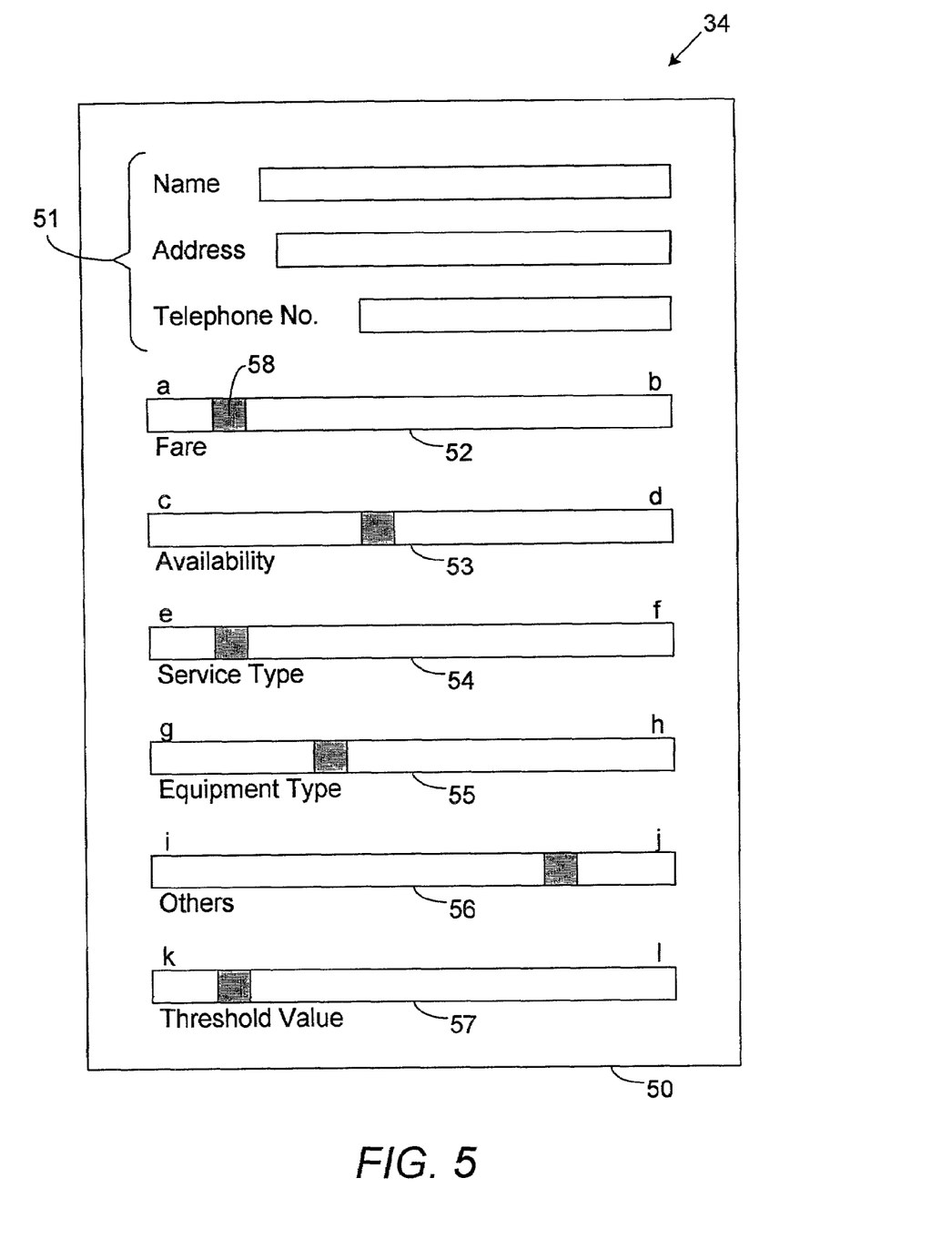
FIG. 5 illustrates an exemplary consumer profile module according to some embodiments of the invention.

As can be seen in FIG. 5, the exemplary traveler profile 50 may have several data entry boxes for entering the traveler's personal information and preferences. For example, a set of data entry boxes 51 may record the traveler's name, address, and telephone number. A fare box 52 allows the traveler to specify the degree to which the price of a fare will figure in his selection of an itinerary. Similarly, an availability box 53 allows the traveler to specify the degree to which he is willing or unwilling to change his planned travel dates. The service type box 54 allows the traveler to specify how strongly he feels about his selected service type. An equipment type box 55 allows the traveler to specify how strong his preferences are for a particular equipment type.

Although a few of the most common preferences have been listed above, other traveler preferences in addition to, or instead of, the ones listed above may also be used as appropriate. For example, various industry surveys and quality measurements may be used such as the on-time arrival rankings issued by the FAA, average number of lost luggage complaints, most frequent flyer miles earned, and other similar industry metrics. These other preferences are indicated generally here by the "Others" box 56.

Furthermore, although the travel preferences in the traveler profile may be set by the traveler based on his individual preferences, the invention is not limited thereto. In some embodiments, the travel preferences may be set based on the preferences of a third party. For example, where the traveler is traveling for business purposes, the travel preferences may be pre-specified by the traveler's employer based on a company or corporate travel policy such as, for example, economy class seating only.

In addition to specifying the various personal preferences, the traveler may also control the number of itineraries he wishes to receive from the search engine 28 through a threshold value box 57. Recall that, in some embodiments of the invention, each one of the itineraries may be assigned a travel value index which indicates the value of the particular itinerary relative to other itineraries returned by the search engine. The threshold value box 57 allows a threshold value to be specified for the travel value indices so that only itineraries meeting the threshold value will be returned from the search engine. Preferably, the threshold value is manually set by the traveler after considering the various preferences defined in his traveler profile. However, in some embodiments, the threshold value may be a value that is set automatically by the search value program 30. In the latter case, the search value program 30 may perform one or more known logical/mathematical operations on the personal preferences defined by the traveler to arrive at an acceptable threshold value. In either case, unusable or undesirable itineraries are effectively screened or removed from among the returned itineraries beforehand so that the traveler need not have to consider them.

Another advantage of the threshold value feature is that the data processing demands on the high-end computer 20 may be reduced. For example, if it is determined during the query of, say, the departure date criteria, that a certain itinerary will not meet the threshold value, then it is not necessary to query the remaining criteria for that itinerary. In other words, that particular itinerary may simply be skipped over during the query of the database for the return date, service type, and equipment type.

The weight or importance of a particular criteria, in some embodiments, may be a numerical value that is specified by the traveler using, for example, a sliding box indicator 58 or other similar indicating modes. For each criteria, the sliding box indicator 58 may be dragged between an upper numerical limit on the right end (representing a strong preference) and a lower numerical limit on the left end (representing no preference). The upper and lower numerical limits are denoted in FIG. 5 by the lowercase letters at either ends of the preference boxes and may be the same or different for each criterion.

The actual numerical value set by the traveler, via the sliding box indicator 58, in the preference box for each criterion may then be used by the travel value algorithm module 36 as a basis to determine the preference factor (explained further below) for that criterion in a travel value algorithm. A sample travel value algorithm is shown in Equation (1), where:

| Term | Description |
| --- | --- |
| Optimal | best possible travel value index that can be obtained |
| LFA | lowest fare available |
| LFP | lowest fare possible (but perhaps not available) |

-continued

| Term | Description |
| --- | --- |
| FM | fare multiplier |
| AI | availability index |
| TSI | type of service index |
| EI | equipment index |
| XI | index for all other criteria that may be taken into consideration |

$$TVI = \text{Optimal} - \left[\frac{(LFA - LFP)}{LFA} * FM\right] \pm AI \pm TSI \pm EI \pm XI \quad (1)$$

In Equation (1), the terms FM, AI, TSI, EI, and XI are the preference factors, the value of which may be mathematically derived by the travel algorithm module 36 using the numerical value for each preference specified by the traveler. For example, the fare multiplier FM may be mathematically derived from the numerical value set in the fare preference box 52, the availability index AI may be mathematically derived from the numerical value set in the availability preference box 53, and so on. In some embodiments, FM, AI, TSI, EI, and XI may take on values that are exactly the same as the numerical values set by the traveler in the corresponding preference boxes. In other embodiments, however, FM, AI, TSI, EI, and XI may take on values that are different, but directly or indirectly proportional to the numerical values set by the traveler, which values may be derived using some known mathematical formula.

By way of further explanation of the fare multiplier FM, this preference factor defines the relative weight to be assigned to the price of a fare. The relative weight can be defined as a ratio of the lowest fare available minus the lowest fare possible over the lowest fare available, with the ratio then multiplied by the fare multiplier FM. The types of fares may include published fares as well as non-published fares (e.g., private fares, negotiated fares), and any other types of fares that may be obtained from the databases 16.

The travel value algorithm defined by the travel value algorithm module 36 may then be used by the travel value index module 38 to calculate a travel value index (TVI) for each one of the itineraries returned by the search engine. After the travel value index module 38 calculates the travel value index, it determines whether any of the itineraries satisfy the threshold value defined by the traveler. Itineraries that do not satisfy the threshold value are discarded by the travel value index module 38, while those that do are presented to the traveler for consideration.

A hypothetical example of how the travel value algorithm in Equation (1) may be used to calculate the travel value index will now be described. For this example, it may be assumed that the preference factors exactly mirror their corresponding preferences as set by the traveler in the various preference boxes. Thus, consider the case where:

Optimal travel value index is 100  
FM fare multiplier is 50    (minimum a = 0, maximum b = 100)  
AI availability index is 10    (minimum c = 0, maximum d = 10)  
TSI type of service index is 5    (minimum e = 0, maximum f = 10)  
EI equipment index is 7    (minimum g = 0, maximum h = 10)  
XI other index is 0    (minimum i = 0, maximum j = 10)  
threshold value is 70    (minimum k = 0, maximum l = 100)

Assume further that the query returned an itinerary where the lowest fare available is $100, the lowest fare possible is $50, the travel dates match the planned travel dates, but the service type and equipment type do not match those which were selected. Using the algorithm represented by Equation (1), the travel value index may be calculated as follows:

$$TVI = 100 - \left[\frac{(100-50)}{100} * 50\right] + 10 - 6 - 7 \pm 0 \quad (2)$$

From Equation (2), the travel value index that will be assigned to the itinerary is 72. This travel value index satisfies the threshold value of 70 and, therefore, the itinerary may be returned as a possible travel solution. However, had the threshold value been set to 80, for example, then the itinerary would not be returned at all. Moreover, in some embodiments, the search value program 30 may cause this itinerary to be canceled immediately after the type of service criterion query is completed because there would be no need to run the equipment type query. A close examination reveals that after the type of service criterion query is completed, it is impossible for this itinerary to satisfy a threshold value of 80. Therefore, data processing capacity may be reserved by abandoning this itinerary before final completion of all the criteria queries.

Note that, although 100 was used as the optimal travel value index in the above example with the relative weight of the fare deducted therefrom, the invention is not to be limited to this particular arrangement and other values and arrangements may certainly be used. For example, in some embodiments, an optimal value of 0 may be used and the relative weight of the fare may be added thereto instead of deducted. Furthermore, the algorithm represented by Equation (1) is simply one of many possible algorithms that may be used to calculate the travel value index. For example, an algorithm such as the one represented in Equation (3) where the preference factors are only deducted from and not added to the optimal travel value index may be used. An algorithm that is based on Equation (3) may also differ from an algorithm based on Equation (1) in the manner in which the relative weight of the fare is derived.

$$TVI = \text{Optimal} - [(LFA - LFP) * FM + AI + TSI + EI + XI] \quad (3)$$

An exemplary list of itineraries is provided below for illustrative purposes. As can be seen, the first itinerary has a travel value index of 95%, whereas the second itinerary has a travel value index of 88%. Therefore, based on the specified traveler preferences, the first itinerary has more relative value to the traveler than the second itinerary even though the second itinerary has a lower fare. Likewise, the second itinerary has more relative value to the traveler than the third itinerary (possibly because of the lower fare), and so on.

1. TVI=95%
Departure: O'Hare International, American Airlines Flt. 135, 4:35 PM February 28, Boeing 747, economy, non-stop.
Return: Bush International, American Airlines Flt. 213, 5:05 PM March 7, Boeing 737, economy, non-stop.
Fare: $369.00
2. TVI=88%
Departure: O'Hare International, Continental Flt. 1145, 6:15 PM March 1, Boeing 767, economy, one connection.
Return: Bush International, Continental Flt. 549, 7:50 PM March 7, Boeing 747, economy, one connection.
Fare: $350.00
3. TVI=80%
Departure: O'Hare International, Delta Airlines Flt. 208, 6:35 AM February 27, Boeing 747, economy, two connections.
Return: Bush International, Delta Airlines Flt. 1214, 5:05 PM March 6, Boeing 747, economy, two connections.
Fare: $369.00
4. TVI=65%
Departure: O'Hare International, TWA Flt. 421, 8:05 AM February 27, Boeing 737, economy, one connection.
Return: Bush International, TWA Flt. 224, 5:35 PM March 6, Boeing 737, economy, non-stop.
Fare: $449.00
5. TVI=50%
Departure: O'Hare International, US Air Flt. 302, 6:25 AM February 26, Boeing 767, economy, two connections.
Return: Bush International, US Air Flt. 14, 5:05 PM March 7, Boeing 767, economy, non-stop.
Fare: $269.00

Figure 6:
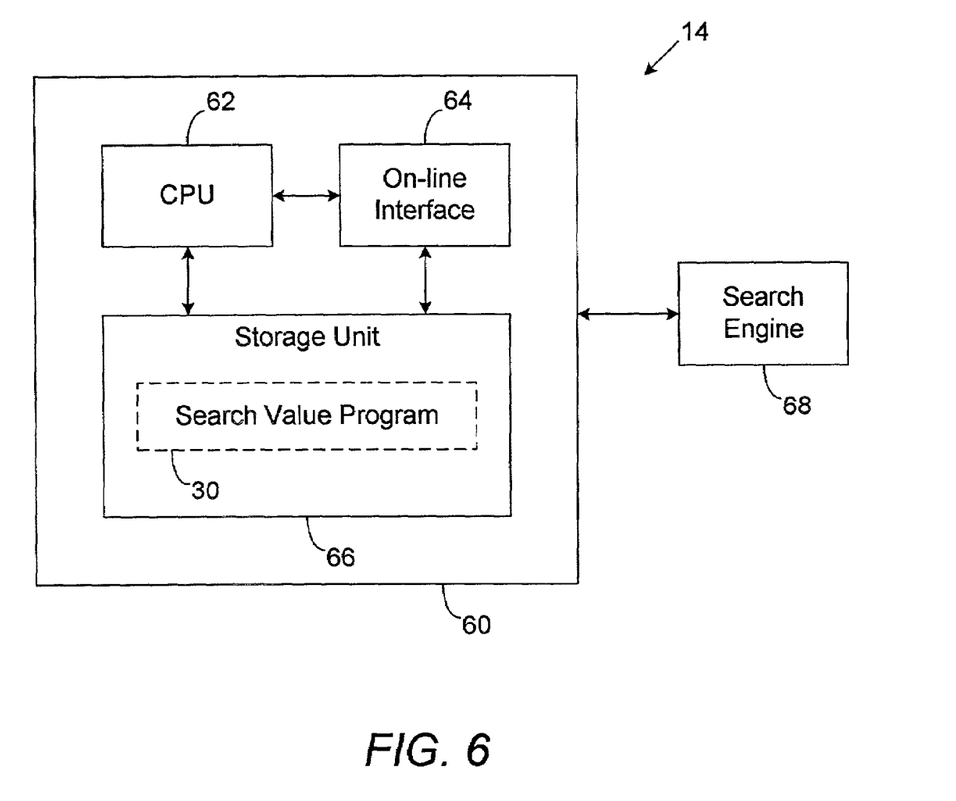
FIG. 6 illustrates another exemplary computer system according to some embodiments of the invention.

The foregoing embodiments have been described with respect to a search value program 30 stored and executed on the server 12. In alternative embodiments, the search value program 30 may be installed and executed locally on a data processing terminal (e.g., desktop computer, laptop, hand-held terminal) of the users 14, as shown in FIG. 6. The data processing terminal 60 may have a number of functional components including a central processing unit 62, an on-line interface 64, and a storage unit 66. The functional components may operate in essentially the same way as the functional components of the high-end computer 20 described in connection with FIG. 2. However, in these embodiments, the search value program 30 may be installed locally on the data processing terminal 60 and stored in the storage unit 66 instead of the server 12.

In some embodiments, the data processing terminal 60 may be used by one of the users 14, for example, a travel agent, to access a search engine 68 that is maintained and operated by a third party service provider. Thus, the search engine 62 may not actually reside on the data processing terminal 60, but may instead be accessible via a remote network connection.

Figure 7:
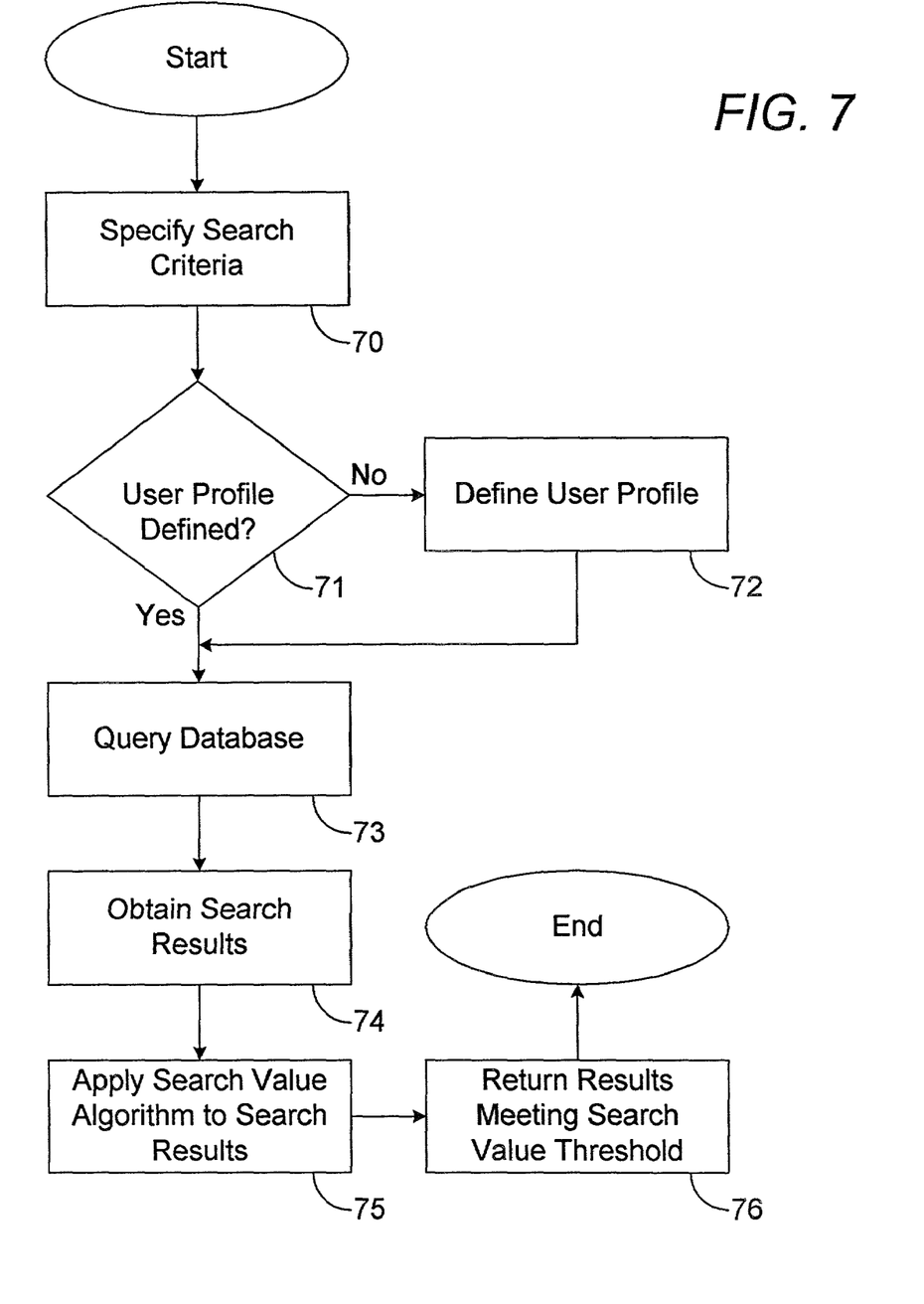
FIG. 7 illustrates an exemplary method according to some embodiments of the invention.

FIG. 7 illustrates a flowchart of a method according to some embodiments of the present invention. At step 70, one or more search criteria may be specified. A determination may be made at step 71 as to whether a user profile has been defined. If no, the user profile may be defined at step 72 including setting of a number of user preferences associated with the search criteria. If yes, a query may be initiated in an appropriate database at step 73 for the search criteria specified. At step 74, search results matching the search criteria may be obtained. A search value algorithm may be applied to the search results at step 75. The search value algorithm may use a number of preference factors that are derived from the user preferences in the manner described above. Search results meeting a user defined threshold value may then be returned for consideration by the user at step 76.

Figure 8:
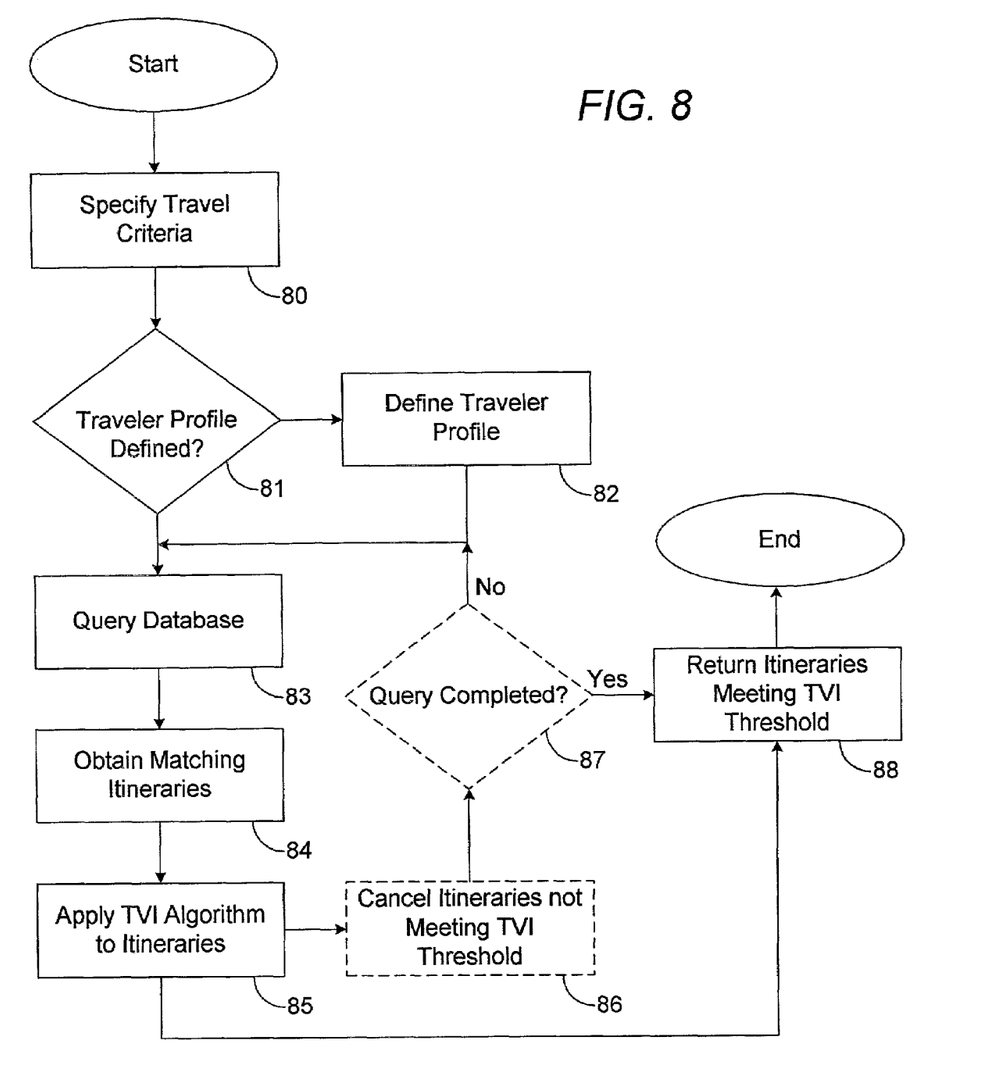
FIG. 8 illustrates another exemplary method according to some embodiments of the invention.

FIG. 8 illustrates a flowchart of another method according to some embodiments of the present invention. The method of FIG. 8 is related specifically to the travel planning industry. At step 80, a number of travel criteria may be specified. A determination may be made at step 81 as to whether a travel profile has been defined. If no, the travel profile may be defined at step 82 including setting of a number of traveler preferences associated with the travel criteria. If yes, a query may be initiated in a travel information database at step 83 for the travel criteria specified. At step 84, itineraries matching the travel criteria may be obtained. A travel value algorithm may be applied to the itineraries at step 85. The travel value algorithm may use a number of preference factors that are derived from the travel or preferences. Itineraries meeting a traveler defined threshold value may be returned for consideration by the traveler at step 88.

Alternatively, itineraries not meeting a traveler defined threshold value may be canceled at an optional step 86 (dashed lines), and a determination may be made as to whether the query has been completed at optional step 87. If no, the query may be continued at step 83. If yes, itineraries meeting a traveler defined threshold value may be returned for consideration by the traveler at step 88.

Although various embodiments of the invention have been shown and described, it will be appreciated by those skilled in the art that changes may be made to these embodiments without departing from the principles and the spirit of the invention, the scope of which is defined in the appended claims.

What is claimed is:

1. A method for facilitating selection of travel itineraries, comprising:

selecting one or more travel criteria;

allowing a traveler to define traveler preferences associated with said travel criteria and storing said traveler preferences in a traveler profile;

deriving preference factors including a lowest fare multiplier, an available dates index, a non-stop service index, and an equipment type index for said travel criteria based on said traveler preferences;

initiating a query of at least one travel information database for itineraries matching said selected travel criteria using an on-line search engine;

calculating a travel value index for each itinerary using a travel value algorithm that subtracts preference factors from, or adds preference factors to, or both, a fixed optimal value of said travel value index depending on said criteria matching itineraries; and returning only itineraries where said travel value index thereof satisfies a traveler defined travel value index threshold.

2. The method according to claim 1, further comprising canceling before final completion of said query any itineraries that cannot satisfy said traveler defined threshold.

3. The method according to claim 1, wherein said travel value algorithm is defined in a manner such that an optimal value for said travel value index is approximately 100 percent.

4. The method according to claim 1, wherein said steps of selecting, allowing, deriving, and initiating are performed over the Internet using a Web browser.

5. The method according to claim 4, further comprising allowing said traveler to modify said traveler preferences in real time over the Internet using said Web browser and repeating said deriving, initiating, calculating, and returning based on modified preferences.

6. The method according to claim 4, wherein the traveler preferences include preferences involving fare, availability, service type, and equipment type.

\* \* \* \* \*